(12) United States Patent
Gill

(10) Patent No.: US 6,396,669 B1
(45) Date of Patent: May 28, 2002

(54) AP PINNED PTMN SPIN VALVE READ HEAD BIASED FOR PLAYBACK SYMMETRY AND MAGNETIC STABILITY

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,121

(22) Filed: Feb. 8, 2000

(51) Int. Cl.[7] .............................................. G11B 5/039
(52) U.S. Cl. ...................... 360/319; 360/313; 360/320; 360/324
(58) Field of Search ............................. 360/324, 324.1, 360/324.11, 324.12, 319, 320

(56) References Cited

U.S. PATENT DOCUMENTS

| | | | |
|---|---|---|---|
| 5,696,656 A | * 12/1997 | Gill et al. ..................... | 360/113 |
| 5,768,071 A | 6/1998 | Lin ............................ | 360/113 |
| 5,784,225 A | 7/1998 | Saito et al. ................. | 360/113 |
| 5,828,529 A | 10/1998 | Gill ............................ | 360/113 |
| 5,869,963 A | 2/1999 | Saito et al. ................. | 324/252 |
| 5,910,344 A | 6/1999 | Hasegawa et al. .......... | 427/599 |
| 6,061,210 A | * 5/2000 | Gill ............................ | 360/113 |

* cited by examiner

Primary Examiner—Hoa T. Nguyen
Assistant Examiner—Noel Monardes
(74) Attorney, Agent, or Firm—Ervin F. Johnston

(57) ABSTRACT

A spin valve sensor of a read head has a platinum manganese (PtMn) pinning layer that pins a magnetic moment of an antiparallel (AP) pinned layer structure. The pinned layer structure has a first AP pinned layer exchange coupled to the pinning layer so that the magnetic moment of the first AP pinned layer is pinned in a first direction and has a second AP pinned layer that has a magnetic moment pinned in a second direction antiparallel to the first direction. A free layer structure of the spin valve sensor is located asymmetrically between first and second shield layers so that when a sense current is conducted through the sensor a net image current field is executed on the free layer structure by the shield layers. One of the AP layers is thicker than the other so that $H_I = H_{FC} + H_D + H_{IM}$ is exerted on the free layer structure where $H_I$ is a sense current field from all conductive layers other than the free layer structure, $H_{FC}$ is a ferromagnetic coupling field from the second AP pinned layer, $H_D$ is a net demagnetization field from the AP pinned layer structure and $H_{IM}$ is a net image current field from the shield layers.

45 Claims, 13 Drawing Sheets

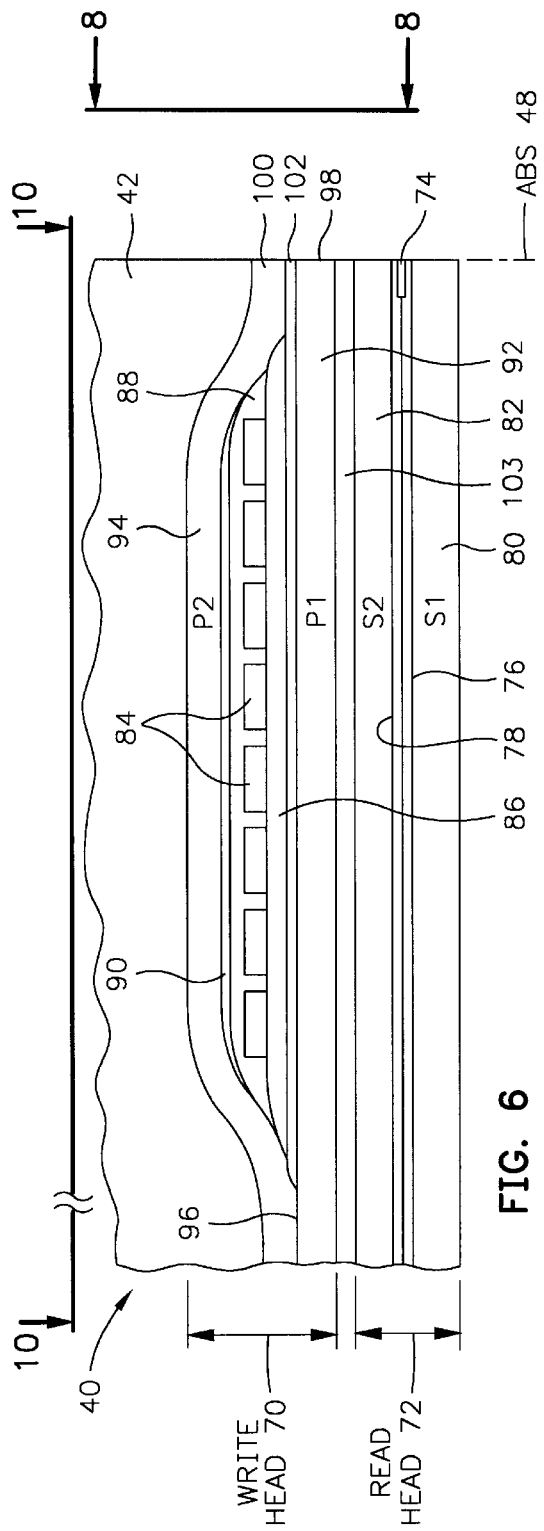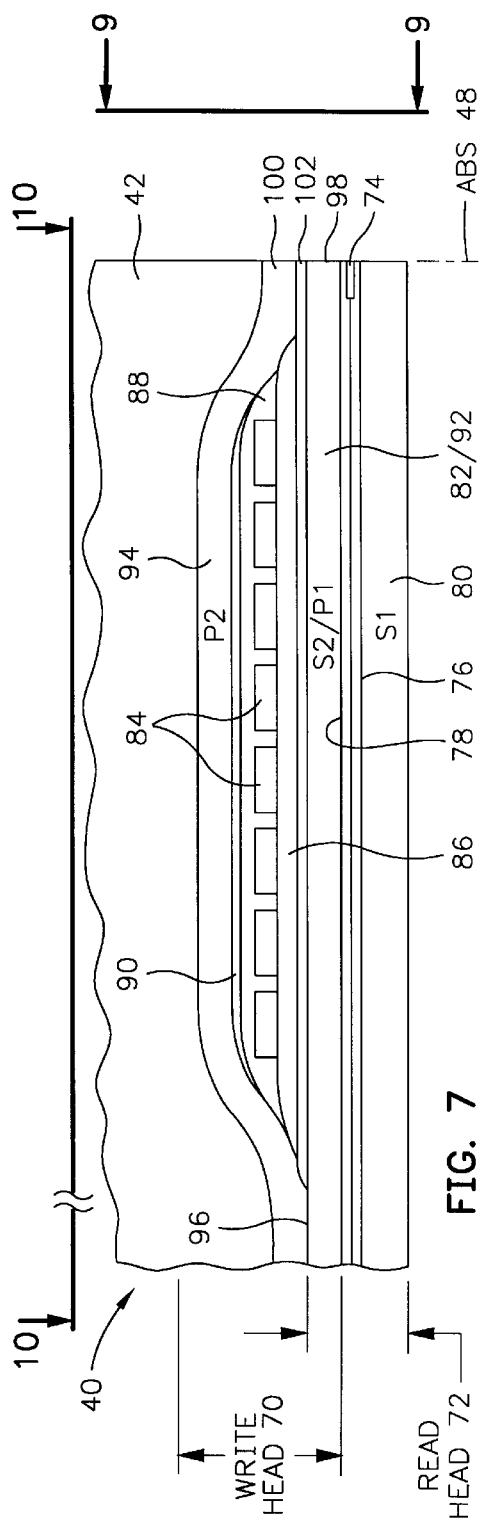

(ABS)

AP PINNED PTMN SPIN VALVE READ HEAD BIASED FOR PLAYBACK SYMMETRY AND MAGNETIC STABILITY

BACKGROUND OF THE INVENTION

1. Field of the Invention

The present invention relates to an antiparallel (AP) pinned platinum manganese (PtMn) spin valve read head biased for playback symmetry and magnetic stability and, more particularly, to such a head wherein the magnetic fields acting on a free layer structure in a spin valve sensor can be balanced so that a magnetic moment of the free layer structure is positioned for playback symmetry.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinning layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. When a sense current is conducted through the spin valve sensor, resistance changes cause potential changes that are detected and processed as playback signals from the rotating magnetic disk. The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

An improved spin valve sensor, which is referred to hereinafter as antiparallel pinned (AP) spin valve sensor, is described in commonly assigned U.S. Pat. No. 5,465,185 to Heim and Parkin which is incorporated by reference herein. The AP spin valve differs from the spin valve described above in that the pinned layer comprises multiple thin films, hereinafter referred to as AP pinned layer. The AP pinned layer has a nonmagnetic spacer film which is sandwiched between first and second ferromagnetic thin films. The first thin film, which may comprise several thin films, is immediately adjacent to the antiferromagnetic layer and is exchange-coupled thereto, with its magnetic moment directed in a first direction. The second thin film is immediately adjacent to the free layer and is exchange-coupled to the first thin film by the minimal thickness (in the order of 6Å) of the spacer film between the first and second thin films. The magnetic moment of the second thin film is oriented in a second direction that is antiparallel to the direction of the magnetic moment of the first film. The magnetic moments of the first and second films subtractively combine to provide a net moment of the AP pinned layer. The direction of the net moment is determined by the thicker of the first and second thin films. The thicknesses of the first and second thin films are chosen so that the net moment is small. A small net moment equates to a small demagnetization (demag) field from the AP pinned layer. Since the antiferromagnetic exchange coupling is inversely proportional to the net moment, this results in a large exchange coupling.

A large exchange coupling between the pinning and AP pinned layers promotes higher thermal stability of the head. When the head encounters high heat conditions due to electrostatic discharge from an object, or due to contacting an asperity on the magnetic disk, a critical high temperature of the antiferromagnetic layer, hereinafter referred to as blocking temperature, can be exceeded, causing the magnetic spins of the pinning layer to be free to rotate in response to a magnetic field. The magnetic moment of the AP pinned layer is then no longer pinned in the desired direction. In this regard, significant advantages of the AP pinned spin valve over the typical single film pinned layer are a greater exchange coupling field and a lower demag field, which enhance thermal stability of the spin valve sensor.

As stated hereinabove, the AP pinned layer structure of the spin valve sensor imposes less demagnetization field $H_D$ on the free layer structure. This is important because a demagnetization field from a pinned layer structure, whether it be a simple single pinned layer or an AP pinned layer structure, is not uniform between the ends of the pinned layer structure that are perpendicular to the ABS. The demagnetization field is strongest at the ends and decays toward the middle of the sensor due to the first and second shield layers. This causes a nonuniform biasing of the free layer structure that impacts the sensitivity of the read head. Further, the demagnetization field $H_D$ is a function of the stripe height of the sensor wherein the stripe height is the distance between the ABS and an opposite recessed end of the sensor in the read head. The reason for this variation is because of the difficulty in controlling the lapping of various rows of magnetic head assemblies to establish their stripe heights. Unfortunately, there is a sigma (distribution of stripe heights) from row to row and between the magnetic head assemblies from row to row. Accordingly, magnetic heads from one row of magnetic heads may have positive readback asymmetry while magnetic heads from another row of magnetic heads many have a negative readback asymmetry. Since the demagnetization field from the AP pinned layer structure is significantly less than that from a simple pinned layer the aforementioned sigma and degree of nonuniform demagnetization field $H_D$ acting on the free layer structure is minimized.

The transfer curve for a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in many applications. +10% readback asymmetry may not be acceptable in applications where the applied field magnetizes the free layer close to saturation. In these applications +10% readback asymmetry can saturate the free layer in the positive direction and will, of course, reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry. There is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. Magnetic instability of the free layer is greater when the readback asymmetry is positive. Accordingly, the magnetic instability of the free layer is greater when the readback asymmetry is positive than when the readback asymmetry is negative.

When the sense current $I_S$ is applied to the spin valve sensor there is an image sense current in each of the first and second shield layers. The image sense current in each shield layer causes each shield layer to produce an image sense current field $H_{IM}$ which traverses the free layer in a direction that is substantially perpendicular to the ABS. When the free layer of the AP pinned spin valve is symmetrically located midway between the first and second shield layers the image sense current fields counterbalance each other so that the net image sense current field on the free layer is zero. By asymmetrically locating the free layer between the first and second shield layers a net image sense current field can be employed for counterbalancing the other magnetic fields on the free layer. This is accomplished by sizing the first and second gap layers that separate the free layer from the first and second shield layers respectively so that the free layer is closer to a selected one of the shield layers. It is preferred that the second gap be thinner than the first gap so that the free layer is closer to the second shield layer. When these thicknesses are carefully selected readback asymmetry can be improved so that magnetic stability of the free layer is optimized.

The location of the transfer curve relative to the bias point is influenced by four major forces on the free layer of a spin valve sensor, namely a ferromagnetic coupling field $H_{FC}$ between the pinned layer and the free layer, a net demag field $H_D$ from the pinned layer, a sense current field $H_I$ from all conductive layers of the spin valve except the free layer and a not image current field $H_{IM}$ from the first and second shield layers. There is a need to deal with these forces on the free layer so as to improve asymmetry of the readback signals.

SUMMARY OF THE INVENTION

As stated hereinabove, when the pinned layer is an AP pinned layer structure the demagnetization field $H_D$ acting on the free layer structure is low as compared to a single pinned layer. However, when the antiferromagnetic (AFM) pinning layer is a metal the sense current field $H_I$ acting on the free layer structure is high as compared to a nonmetallic pinning layer such as nickel oxide (NiO). In the present invention proper biasing of the free layer structure is accomplished by sizing the thicknesses of the layers of the spin valve sensor and the first and second gap layers (G1 and G2) and orienting the direction of the sense current $I_S$ in a predetermined direction through the spin valve sensor so that the sense current field $H_I$ is equal to the demagnetization field $H_D$ plus the ferromagnetic coupling field $H_{FC}$ plus the image current field $H_{IM}$. Accordingly, $H_I=H_D+H_{FC}+H_{IM}$. The sense current $I_s$ is oriented in such a direction that a sense current field from the free layer structure is opposite to a pinning field between the pinning layer and the AP pinned layer structure and one of the first and second read gaps is greater than the other of the first and second read gaps. In a bottom spin valve where the pinning layer is closer to the first gap layer (G1) than to the second gap layer (G2) the first read gap is made thicker than the second read gap. The present invention can be employed whether the ferromagnetic coupling field $H_{FC}$ is positive or negative. The ferromagnetic coupling field $H_{FC}$ is positive when the ferromagnetic coupling field $H_{FC}$ exerted on the free layer structure by the second AP pinned layer is in the same direction as the magnetic moment of the second AP pinned layer and is negative when the ferromagnetic coupling field $H_{FC}$ exerted on the free layer structure is in a direction opposite to the magnetic moment of the second AP pinned layer. If the ferromagnetic coupling field is positive the first AP pinned layer is made thicker than the second AP pinned layer and if the ferromagnetic coupling field is negative the second AP pinned layer is made thicker than the first AP pinned layer.

An object of the present invention is to properly bias a free layer structure in a spin valve sensor when the AFM pinning layer is metal and the pinned layer structure is an AP pinned layer structure.

Another object is to provide a read head wherein a sense current field $H_I$ acting on a free layer structure of a spin valve sensor of the read head is opposed by a demagnetization field $H_D$, a ferromagnetic coupling field $H_{FC}$ and an imaging field $H_{IM}$ acting on the free layer structure.

Other objects and advantages of the invention will become apparent upon reading the following description taken together with the accompanying drawings.

DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DETAILED DESCRIPTION OF THE PREFERRED EMBODIMENTS

Magnetic Disk Drive

Figure 1:
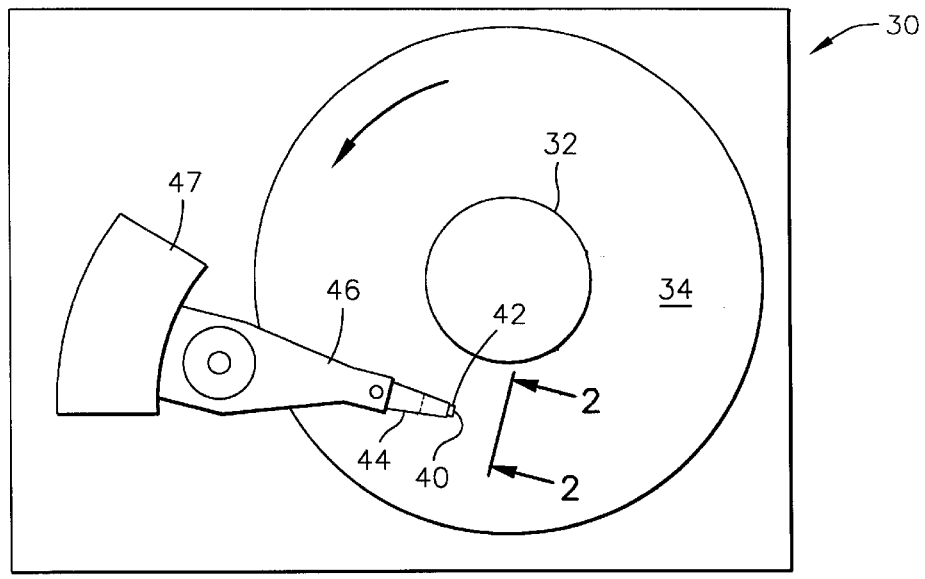
FIG. 1 is a plan view of an exemplary magnetic disk drive.
Figure 2:
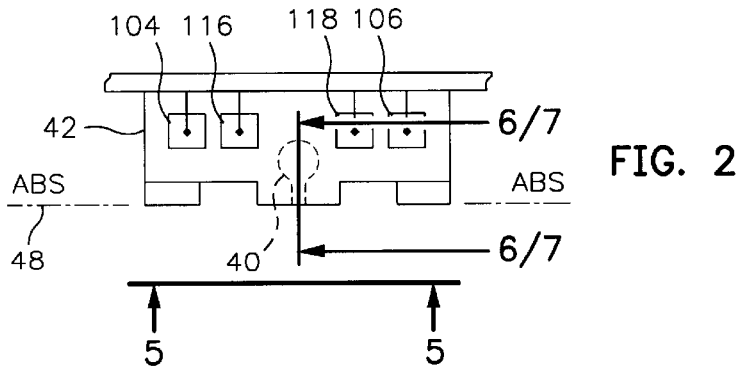
FIG. 2 is an end view of a slider with a magnetic head of the disk drive as seen in plane 2—2 of FIG. 1.
Figure 3:
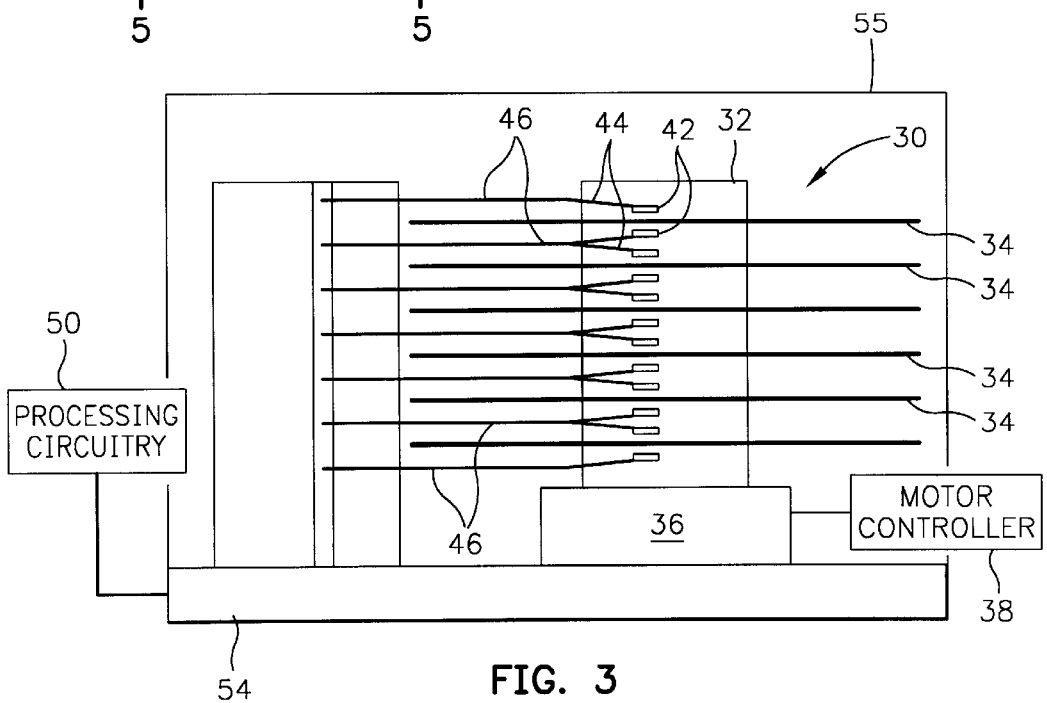
FIG. 3 is an elevation view of the magnetic disk drive wherein multiple disks and magnetic heads are employed.
Figure 4:
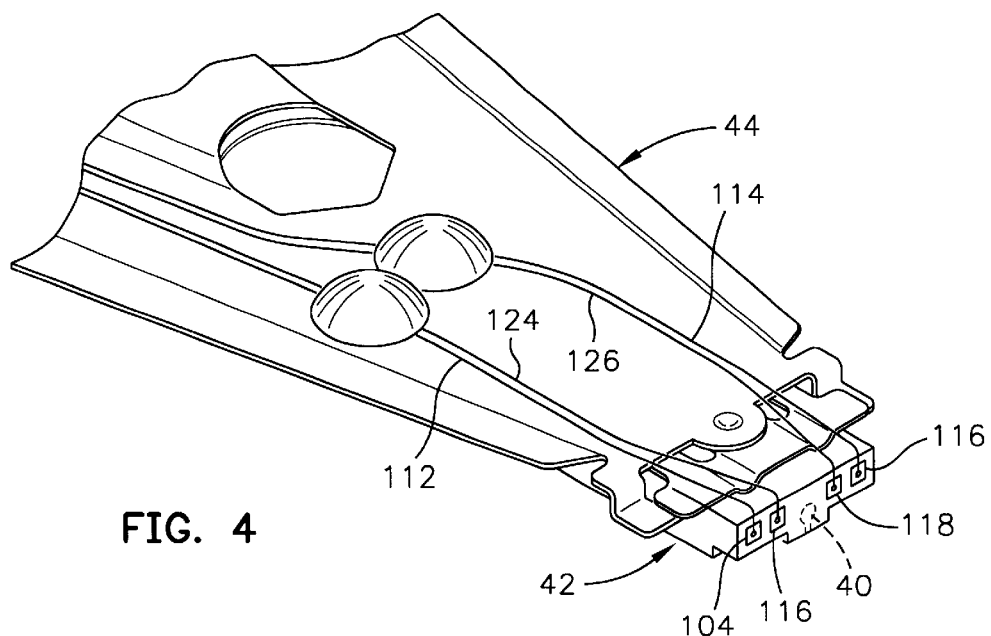
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
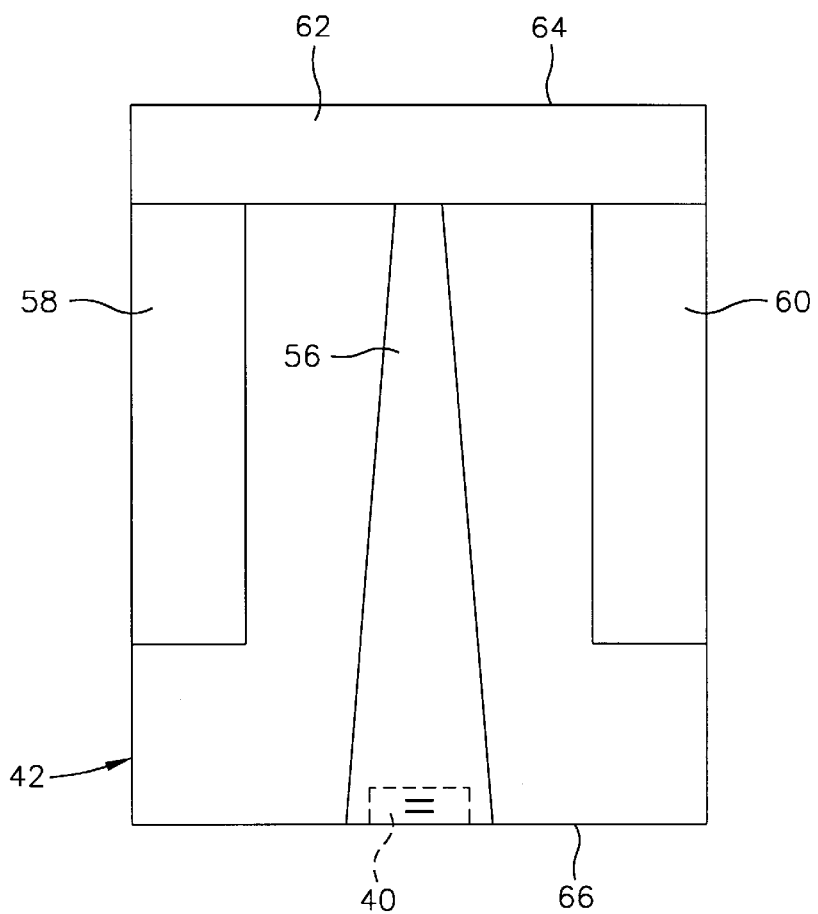
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
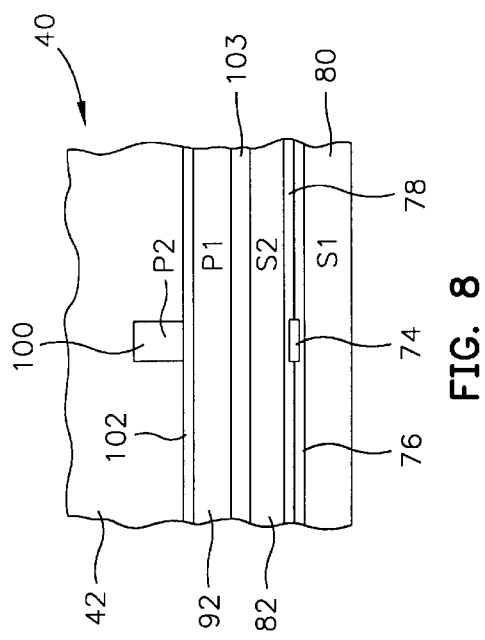
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
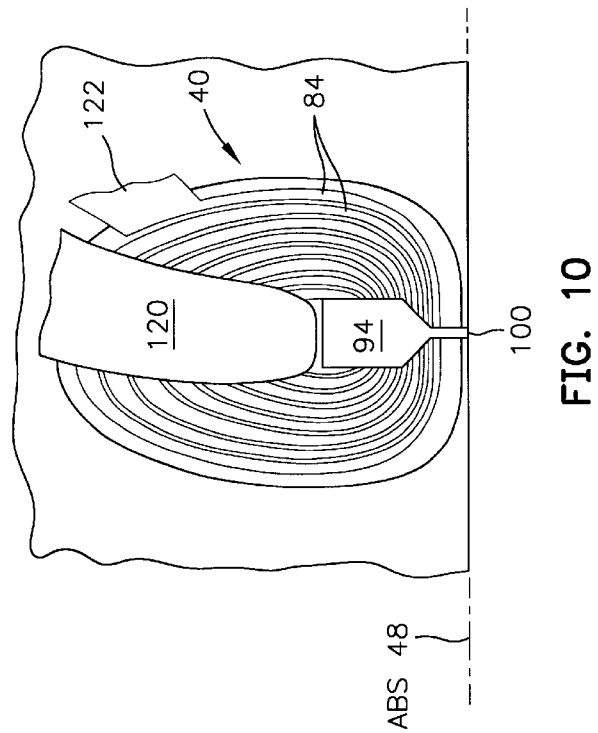
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write, gap layer 102 at the ABS. Each of the pole piece layers 92 and 94 has a yoke portion between its pole tip (98 or 100) and the back gap 96 with the insulation stack located therebetween. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
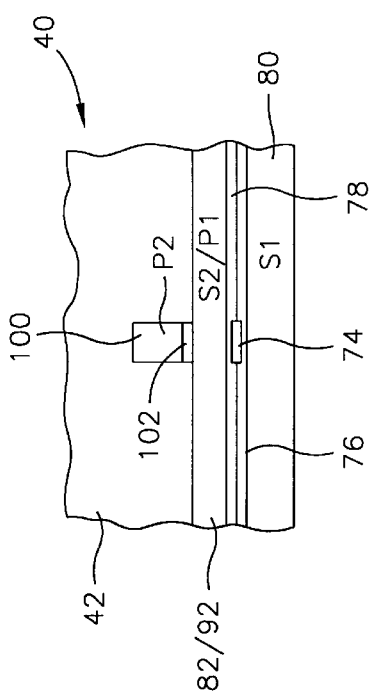
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
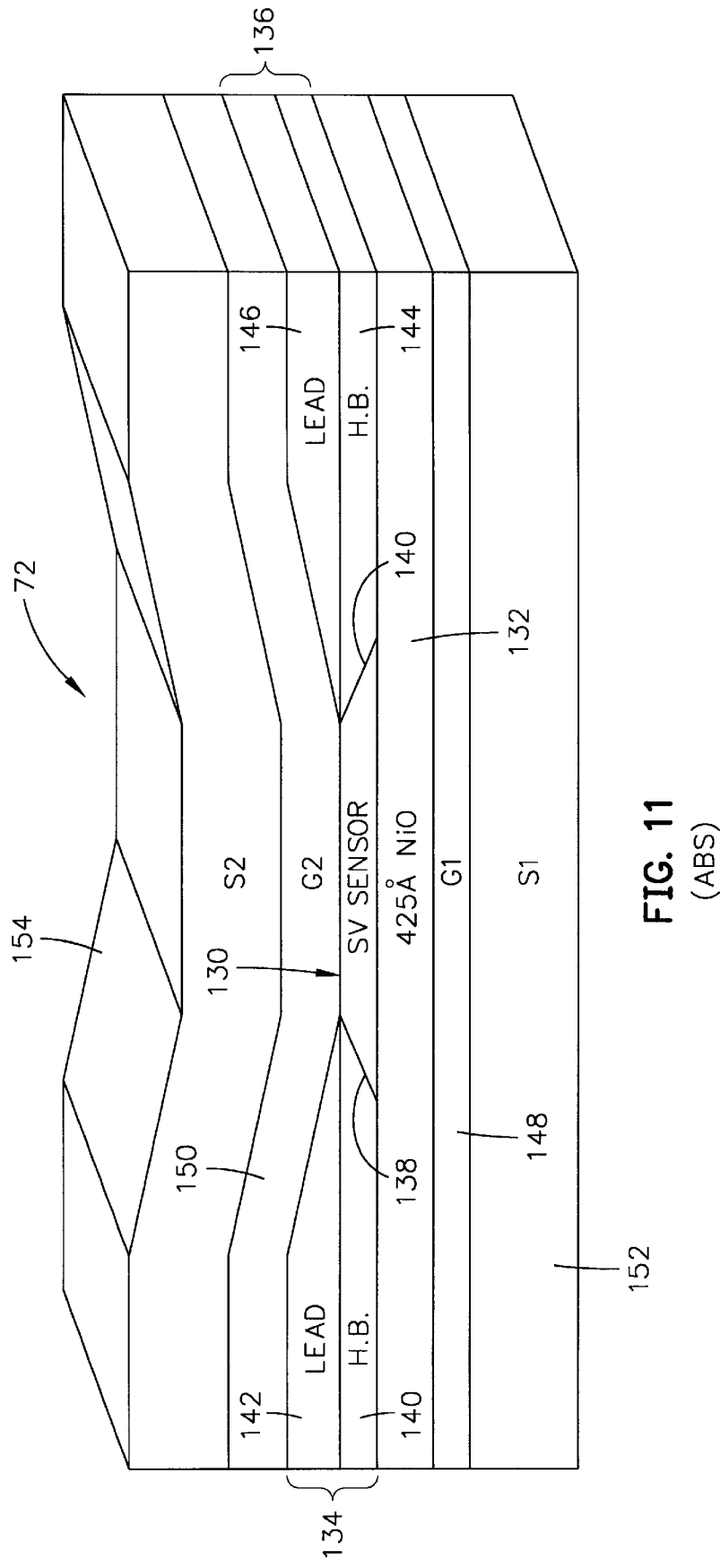
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer is typically 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

The Invention

Figure 12:
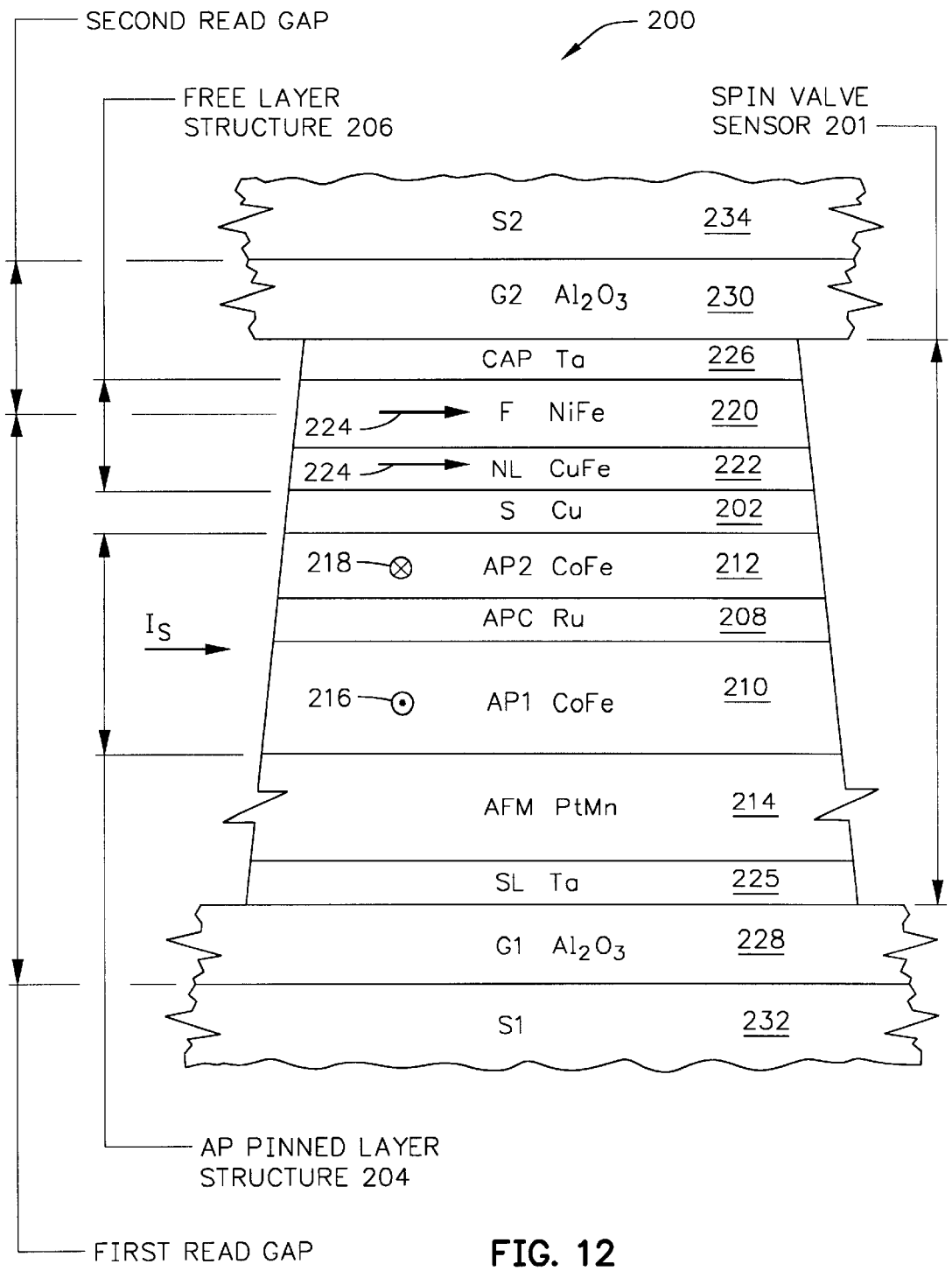
FIG. 12 is an ABS illustration of a first embodiment of the present invention.

FIG. 12 shows a first embodiment 200 of the present read head which includes a spin valve sensor 201. The spin valve sensor includes a spacer layer 202 which is located between an AP pinned layer structure 204 and a free layer structure 206. The AP pinned layer structure 204 includes an antiparallel coupling (APC) layer 208 which is located between first and second AP pinned layers (AP1 and AP2) 210 and 212. The first AP pinned layer 210 is exchange coupled to an antiferromagnetic (AFM) pinning layer 214 so that a magnetic moment 216 of the first AP pinned layer 210 is perpendicular to the ABS in a first direction. By strong antiparallel coupling between the first and second AP pinned layers 210 and 212 the second AP pinned layer 212 has a magnetic moment 218 which is antiparallel to the magnetic moment 216. The free layer structure 206 includes a free layer (F) 220 and a nanolayer (NL) 222. The free layer structure 206 has a magnetic moment 224 which is directed parallel to the ABS when the free layer structure is properly biased with the bias point centered midway on a transfer curve of the spin valve sensor, which will be discussed in more detail hereinbelow. A seed layer (SL) 225 in is located between the first gap layer 228 and the pinning layer 214 for increasing the pinning field of the pinning layer.

A cap layer 226 is located on top of the free layer structure 206 for protecting it from subsequent processing steps. The spin valve sensor is located between first and second gap layers (G1 and G2) 228 and 230 and the first and second gap layers are located between first and second shield layers (S1 and S2) 232 and 234. A sense current $I_S$ is directed, for example, from left to right through the spin valve sensor as shown in FIG. 12. When a signal field from a rotating magnetic disk rotates the magnetic moment 224 of the free layer structure upwardly the magnetic moments 224 and 218 become more parallel which reduces the resistance of the sensor and when the signal field from a rotating magnetic disk rotates the magnetic moment 224 downwardly the magnetic moments 224 and 218 become more antiparallel which increases the resistance of the spin valve sensor. When the sense current $I_S$ is conducted through the spin valve sensor these resistance changes cause potential changes in the processing circuitry 50 in FIG. 3 which are processed as playback signals.

Exemplary thicknesses and materials for the first and second gap layers 228 and 230 are 200 Å of aluminum oxide ($Al_2O_3$) for the first gap layer 228 and 200 Å of aluminum oxide ($Al_2O_3$) for the second gap layer 230. Exemplary thicknesses and materials for the spin valve sensor are 35 Å of tantalum (Ta) for the seed layer 225, 200 Å of platinum manganese (PtMn) for the pinning layer 214, 17 Å of cobalt iron (CoFe) for the first AP pinned layer 210, 8 Å of ruthenium (Ru) for the antiparallel coupling layer 208, 26 Å of cobalt iron (CoFe) for the second AP pinned layer 212, 21 Å of copper (Cu) for the spacer layer 202, 15 Å of cobalt iron (CoFe) for the nanolayer 222, 25 Å of nickel iron (NiFe) for the free layer 220, and 50 Å of tantalum (Ta) for the cap layer 226.

Figure 13:
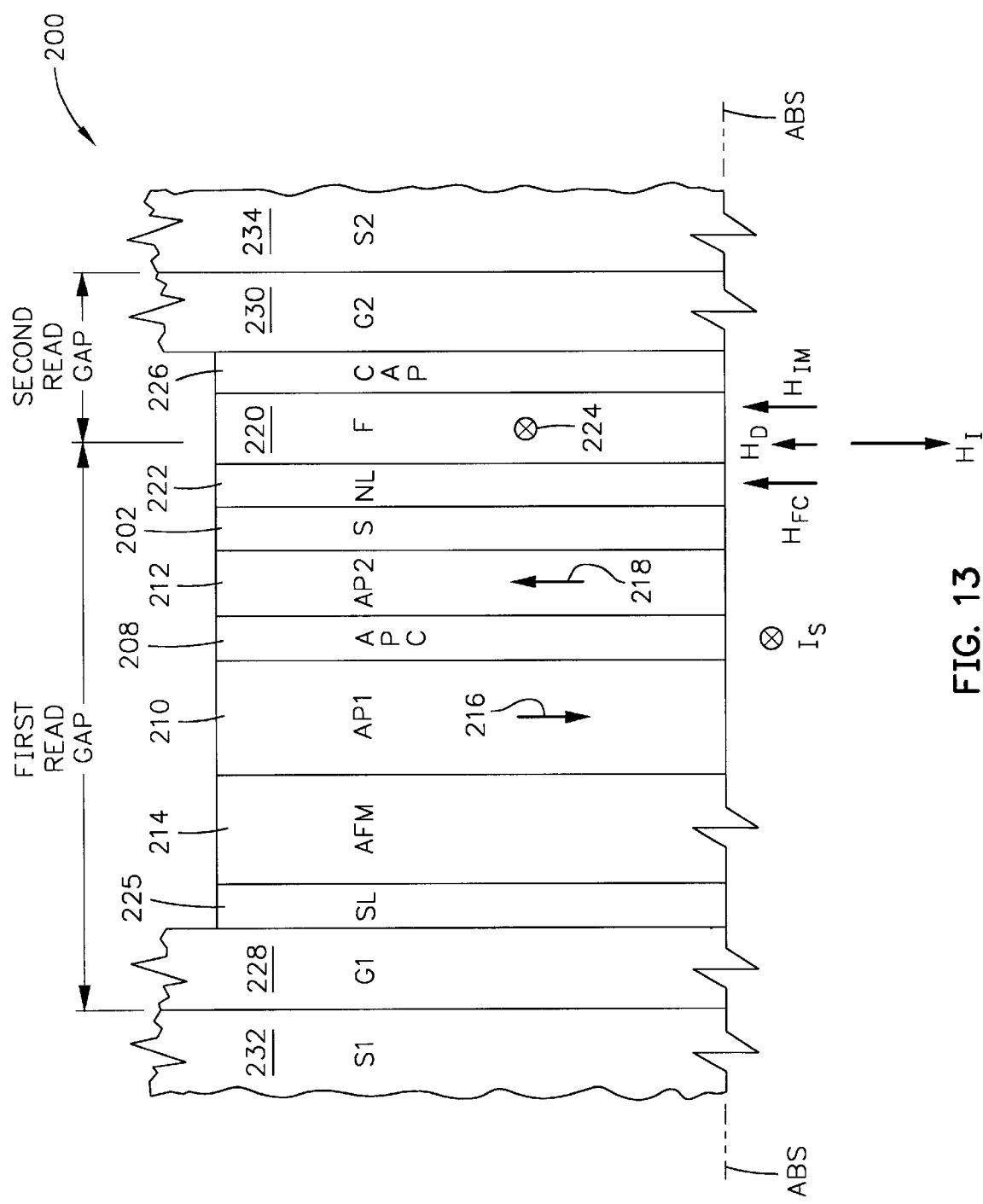
FIG. 13 is a view from the left side of FIG. 12 after rotating 90°.

As shown in FIG. 12 the first AP pinned layer 210 is thicker than the second AP pinned layer 212. Accordingly, there is a net demag $H_D$ acting on the free layer structure 206 which is directed upwardly as shown in FIG. 13. The magnetic moments 216 and 218 of the first and second AP pinned layers may be set by directing a magnetic field of 12 K Oe away from the spin valve sensor in the direction of the magnetic moment 216 for a period of 5 hours in the presence of heat at a temperature of 240° C. This may be accomplished after constructing the spin valve sensor or after constructing the read head. Since the second AP pinned layer 212 has a magnetic moment 218 which is directed into the head the second AP pinned layer exerts a ferromagnetic coupling field $H_{FC}$ which is directed into the head as shown in FIG. 13. In the present invention the first read gap is greater than the second read gap, as shown in FIGS. 12 and 13, so that the free layer structure is closer to the second shield layer 234 than it is to the first shield layer 232. The sense current $I_S$ is oriented in a direction which causes a sense current field from the free layer structure 206 on the first AP pinned layer 210 which is oriented in a direction which is antiparallel to the magnetic moment 216 and which is opposite to the pinning direction between the pinning layer 214 and the first AP pinned layer 210. Another way of stating the direction of the sense current $I_S$ is that a sense current field from all of the metallic layers other than the free layer structure 206 exerted on the free layer structure is opposite to the net demagnetization field $H_D$. The sense current $I_S$ causes image currents in the first and second shield layers 232 and 234 which exert imaging fields on the free layer structure 206. Since the free layer structure is closer to the second shield layer 234 there is a net imaging current field $H_{IM}$ which is directed upwardly into the free layer structure 206. Accordingly, with the present invention the sense current field $H_I$ opposes the ferromagnetic coupling field $H_{FC}$, the net demagnetization field $H_D$ and the net image current field $H_{IM}$.

Figure 14:
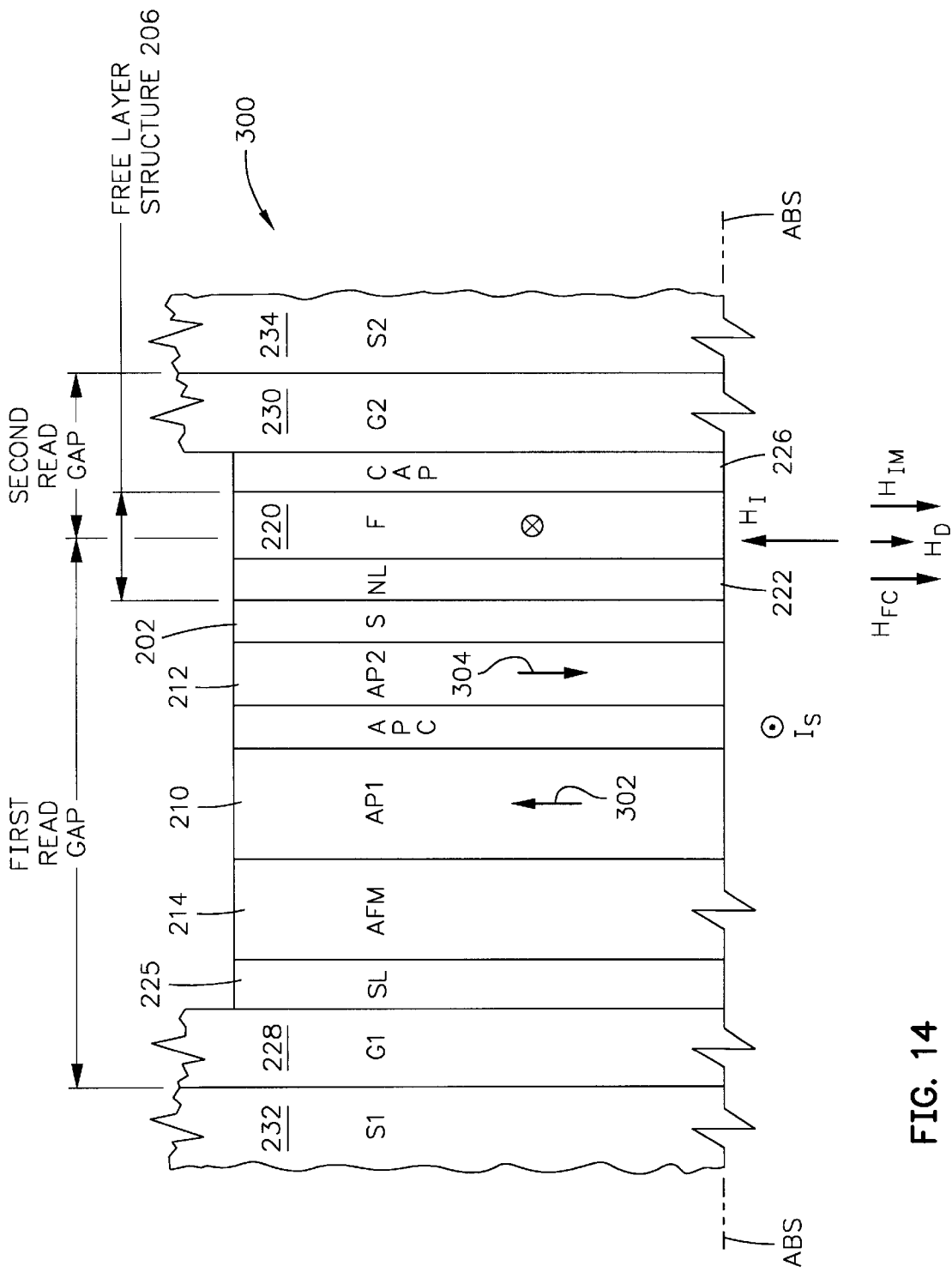
FIG. 14 is the same as FIG. 13 except the directions of the sense current $I_S$ and the magnetic moments of the first and second AP pinned layers (AP1 and AP2) are reversed.

FIG. 14 shows, a read head 300 which is the same as the read head 200 in FIGS. 12 and 13 except the sense current $I_S$ is oriented in an opposite direction and magnetic moments 302 and 304 of the first and second AP pinned layers are antiparallel to the magnetic moments 216 and 218 respectively in FIGS. 12 and 13. With this arrangement the sense current field $H_I$ in FIG. 14 is antiparallel to the sense current $H_I$ in FIG. 13 and the ferromagnetic coupling field $H_{FC}$, the net demag field $H_D$ and the net image current field $H_{IM}$ in FIG. 14 are antiparallel to the ferromagnetic coupling field $H_{FC}$, the net demag field $H_D$ and the image current field $H_{IM}$ in FIG. 13. Accordingly, the sense current field $I_S$ can be oriented in either direction through the spin valve sensor in the present invention. Likewise, the magnetic moment 224 of the free layer structure 206 may be antiparallel to that shown in FIGS. 12–14.

The first read gap may be twice the second read gap, however, in a preferred embodiment the first read gap is one and one-half times the second read gap. This arrangement would be reversed, however, in a top spin valve wherein the order of the layers of the spin valve sensor are reversed. After formation of the first gap layer 228 in a top spin valve the free layer 220 is formed on the first gap layer, the nanolayer 222 is formed on the free layer 220, the spacer layer 202 is formed on the nanolayer, the second AP pinned layer 212 is formed on the spacer layer, the antiparallel coupling layer 208 is formed on the second AP pinned layer, the first AP pinned layer 210 is formed on the AP coupling layer, the pinning layer 214 is formed on the first AP pinned layer 210, the cap layer 226 is formed con the pinning layer 214 and the second gap layer 230 is formed on the cap layer. In the top spin valve arrangement the second read gap is larger than the first read gap so that the net imaging field $H_{IM}$ comes from the first shield layer 232 instead of from the second shield layer 234. In the top spin valve the magnetic moments of the first and second AP pinned layers 210 and 212 and the sense current $I_s$ are oriented in directions so that the sense current field $H_I$ still opposes the ferromagnetic coupling field $H_{FC}$, the net demagnetization field $H_D$ and the image current field $H_{IM}$.

Platinum manganese (PtMn) is the preferred material for the pinning layer 214. The blocking temperature of platinum manganese PtMn) is 330° C. to 350° C. wherein the blocking temperature is the temperature at which the magnetic spins of the pinning layer are free to rotate i response to a magnetic field. A high blocking temperature is important since the sense current field from the free layer structure 206 opposes the magnetic moment 216 of the first AP pinned layer. This means that the sense current field from the free layer structure 206 opposes the pinning layer 214 and th efirst pinned layer 210. Accordingly, the platinum manganese (PtMn) of the pinning layer 214 makes the read head thermally stable during construction of the read head after its installation on a magnetic disk drive in spite of the fact that the sense current field from the free layer structure 206 opposes the pinning of the first AP pinned layer 210 by the pinning layer 214. It should be understood that when an electrostatic discharge (ESD) raises the temperature of the spin valve sensor at or above the blocking temperature of the pinning layer 214 the magnetic moment of the first AP pinned layer 210 is free to rotate in response to a magnetic field such as a signal field from the rotating magnetic disk. Further, in a magnetic disk drive the slider carrying the magnetic head may contact an asperity which raises the temperature of the spin valve sensor above the blocking temperature of the pinning layer which can cause the magnetic moment of the first AP pinned layer 210 to become disoriented in the presence of a magnetic field. If the blocking temperature of the pinning layer 214 is high enough these occurrences will not occur.

Figure 15:
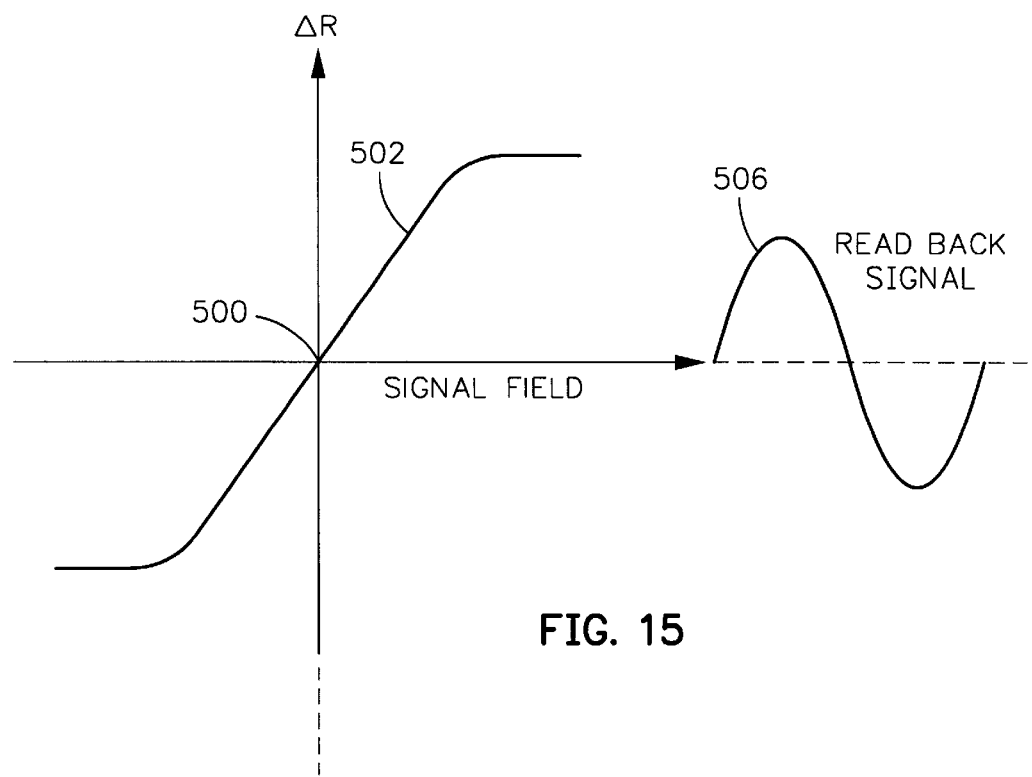
FIG. 15 shoves an exemplary transfer curve of a read head with readback signal symmetry.
Figure 16:
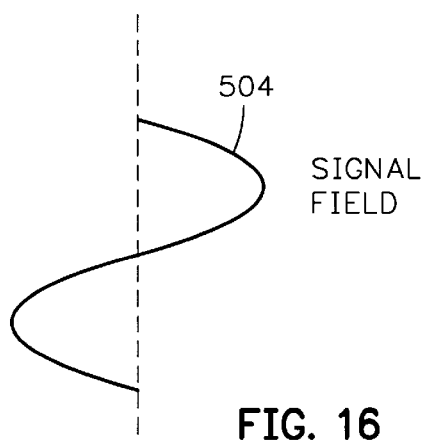
FIG. 16 is a signal field applied to the read head by a rotating magnetic disk.

FIGS. 15 and 16 show graphs for a properly biased free layer structure of a spin valve sensor. In FIG. 15 a zero bias point 500 is shown midway on a transfer curve 502 of the spin valve sensor. In response to signal fields 504 from a rotating magnetic disk the readback signals 506 are symmetrical. When the signal field 504 increases the resistance of the spin valve sensor the read head produces a positive readback signal and when the signal field 504 decreases the resistance of the spin valve sensor the read head produces a negative readback signal. When the bias point 500 is lowered on the transfer curve 502 the read head is said to have positive asymmetry because the positive portion of the readback signal 506 is greater than the negative portion and when the bias point 500 is moved upwardly on the transfer curve 502 the read head has negative asymmetry because the negative portion of the readback signal 506 is greater than the positive portion thereof. Exemplary fields acting on the free layer structure 206 in FIGS. 12 and 13 are 20 Oe for the sense current field $H_I$, 10 Oe for the ferromagnetic coupling field $H_{FC}$, 5 Oe for the net demagnetization field $H_D$ and 10 Oe for the imaging current field $H_{IM}$. This would cause a net field acting on the free layer structure 206 of about 5 Oe. Each oersted causes about one degree of asymmetry which means that for the values given the read head would have five degrees of asymmetry. Since the net field would rotate the magnetic moment 224 of the free layer structure slightly downwardly toward a more antiparallel position relative to the magnetic moment 218 of the second AP pinned layer the resistance of the spin valve sensor increases which would cause the bias point 500 in FIG. 15 to be located above its present position on the transfer curve 502. In this instance the magnetic head is negatively biased and the negative portion of the readback signal 506 will be greater than the positive portion thereof. Readback asymmetry on the order of five degrees is acceptable in the trade, however, in the present invention the thicknesses of the layers and their arrangement can be adjusted so that the sense current field $H_I$ completely counterbalances the ferromagnetic coupling field $H_{FC}$, the demagnetization field $H_D$ and the imaging current field $H_{IM}$.

Figure 17:
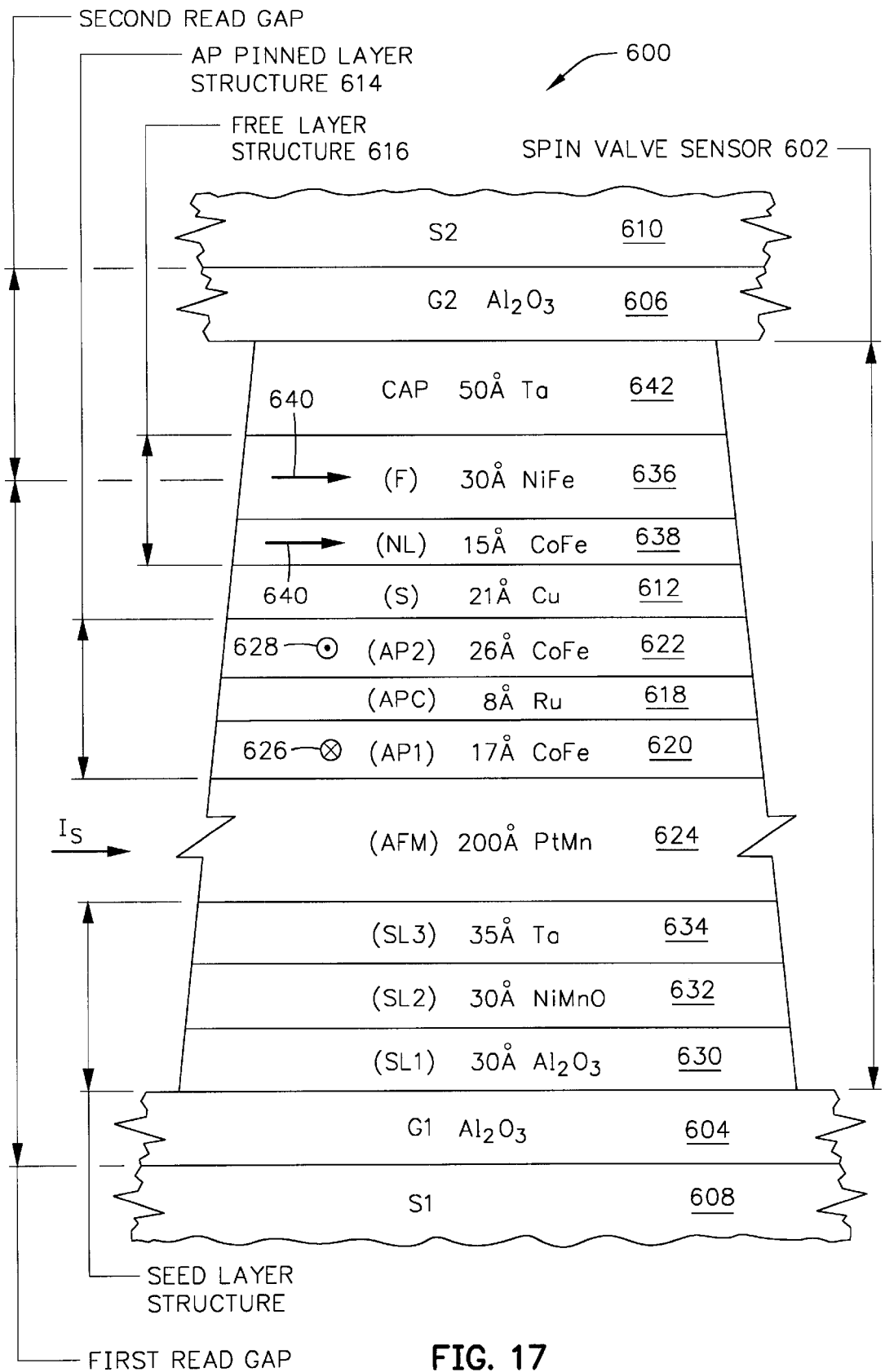
FIG. 17 is an ABS illustration of a second embodiment of the present invention.
Figure 18:
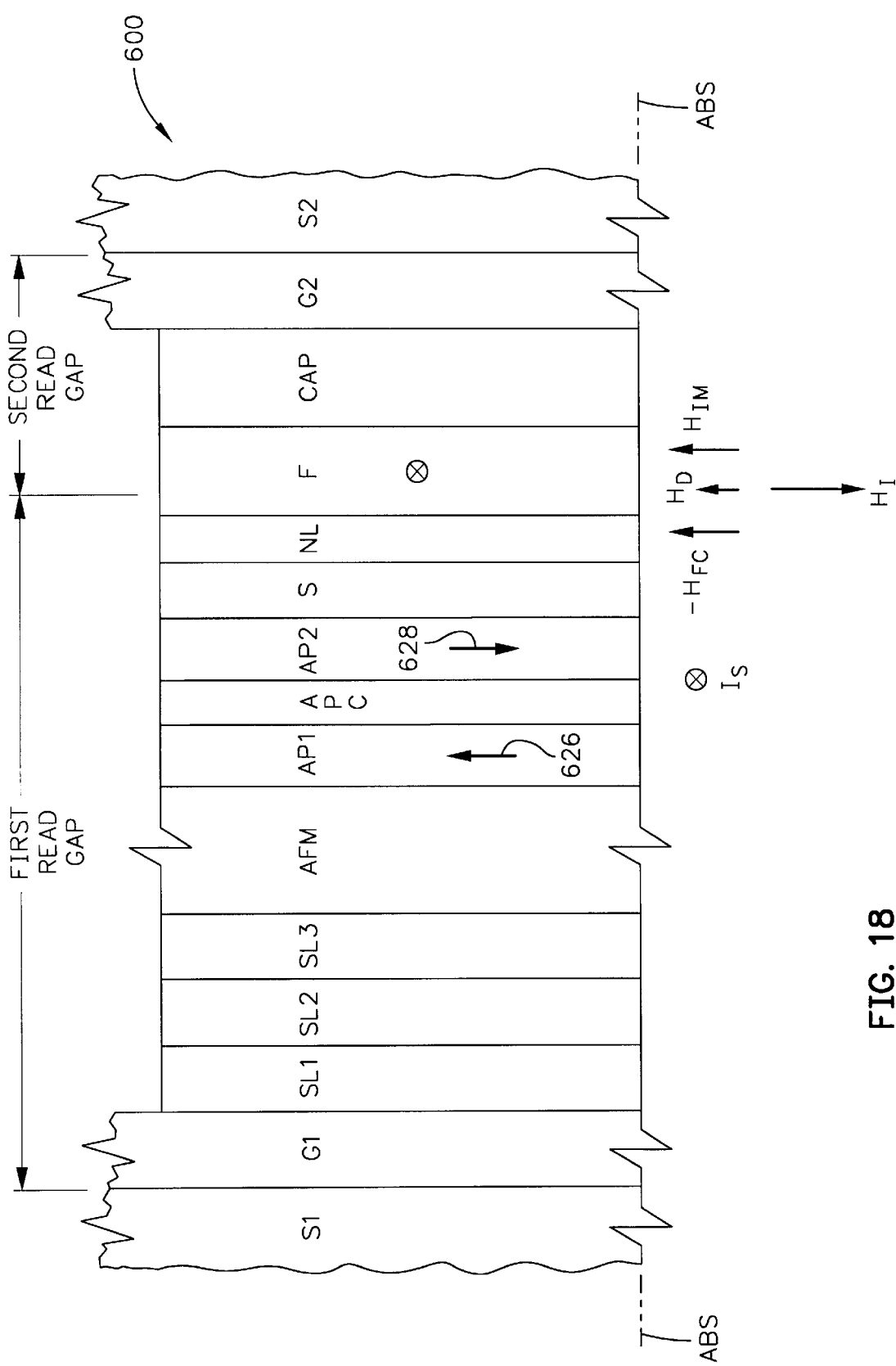
FIG. 18 is a view taken from the left side of FIG. 17 after rotating 90°.

Another embodiment 600 of the present invention is illustrated in FIGS. 17 and 18 which is similar to the embodiment shown in FIGS. 12 and 13 except a ferromagnetic coupling field $H_{FC}$ is negative instead of positive, which will be discussed in more detail hereinafter. The read head 600 includes a spin valve sensor 602 which is located between first and second gap layers (G1 and G2) 604 and 606 and the first and second gap layers 604 and 606 are located between first and second shield layers (S1 and S2) 608 and 610. The spin valve sensor 602 includes a nonmagnetic electrically conductive spacer layer 612 which is located between an AP pinned layer structure 614 and a free layer structure 616. The AP pinned layer structure 614 has an antiparallel coupling layer 618 which is located between a ferromagnetic first AP pinned layer (AP1) 620 and a ferromagnetic second AP pinned layer (AP2) 622. The first AP pinned layer 620 is exchange coupled to am antiferromagnetic (AFM) pinning layer 624 so that a magnetic moment 626 of the first AP pinned layer is pinned perpendicular to the ABS such as away from the ABS as shown in FIG. 17. By a strong antiparallel coupling between the first and second AP pinned layers the second AP pinned layer has a magnetic moment 628 which is antiparallel to the magnetic moment 626. In this embodiment the second AP pinned layer 622 is thicker than the first AP pinned layer 620 so that a net demag $H_D$ from the AP pinned layer structure 614 on the free layer structure 616 will be antiparallel to the magnetic moment 628.

A first seed layer (SL1) 630 is located on the first gap layer 604, a second seed layer (SL2) 632 is located on the first seed layer 630 and a third seed layer (SL3) 634 is located on the second seed layer 632. These seed layers, which influence the microstructures of subsequent spin valve sensor layers formed thereon, in combination with a predetermined thickness of the spacer layer 612, establish the negative ferromagnetic coupling field $-H_{FC}$, which will be discussed in more detail hereinafter.

The free layer structure 616 includes a ferromagnetic free layer (F) 636 and a ferromagnetic nanolayer (NL) 638. The free layer structure 616 has a magnetic moment 640 which is parallel to the ABS when there is readback symmetry and this direction can be to the left, or to the right as shown in FIG. 17. A cap layer 642 may be on the free layer structure 616 for protecting it from subsequent processing steps. Again, when a signal field rotates the magnetic moment 640 upwardly it becomes more antiparallel to the magnetic moment 628 which increases the resistance of the spin valve sensor and when a signal field rotates the magnetic moment 640 downwardly it becomes more parallel to the magnetic moment 628 which decreases the resistance of the head. When the sense current $I_S$ is conducted through the spin valve sensor these changes in resistance causes potential changes in the processing circuitry 50 in FIG. 3 which are processed as playback signals.

The first read rap is larger than the second read gap which causes a net image current field $H_{IM}$ to be directed upwardly into the free layer structure as shown in FIG. 18. Since the magnetic moment 628 is greater than the magnetic moment 626 there is a net demagnetization field $H_D$ on the free layer structure which is directed upwardly into the head. Since the ferromagnetic coupling field is a negative ferromagnetic coupling field $-H_{FC}$ it is directed antiparallel to the magnetic moment 628 into the free layer structure as shown in FIG. 18. The sense current $I_S$ now causes a sense current field $H_I$ which opposes the negative ferromagnetic coupling field $-H_{FC}$ the net demagnetization field $H_D$ and the image current field $H_{IM}$.

Preferred thicknesses for the first and second gap layers 604 and 606 are 200 Å of aluminum oxide ($Al_2O_3$) for the first gap layer 604 and 200 Å of aluminum oxide ($Al_2O_3$) for the second gap layer 606. Preferred thicknesses and materials for the spin valve sensor 602 are 30 Å of aluminum oxide ($Al_2O_3$) for the first seed layer 630, 30 Å of nickel manganese oxide (NiMnO) for the second seed layer 632, 35 Å of tantalum (Ta) for the third seed layer 634, 200 Å of platinum manganese (PtMn) for the pinning layer 624, 17 Å of cobalt iron (CoFe) for the first AP pinned layer 620, 8 Å of ruthenium (Ru) for the antiparallel coupling layer 618, 26 Å of cobalt iron (CoFe) for the second AP pinned layer 622, 21 Å of copper (Cu) for the spacer layer 612, 15 Å of cobalt iron (CoFe) for the nanolayer 638, 30 Å of nickel iron (NiFe) for the free layer 636 and 50 Å of tantalum (Ta) for the cap layer 642.

Figure 19:
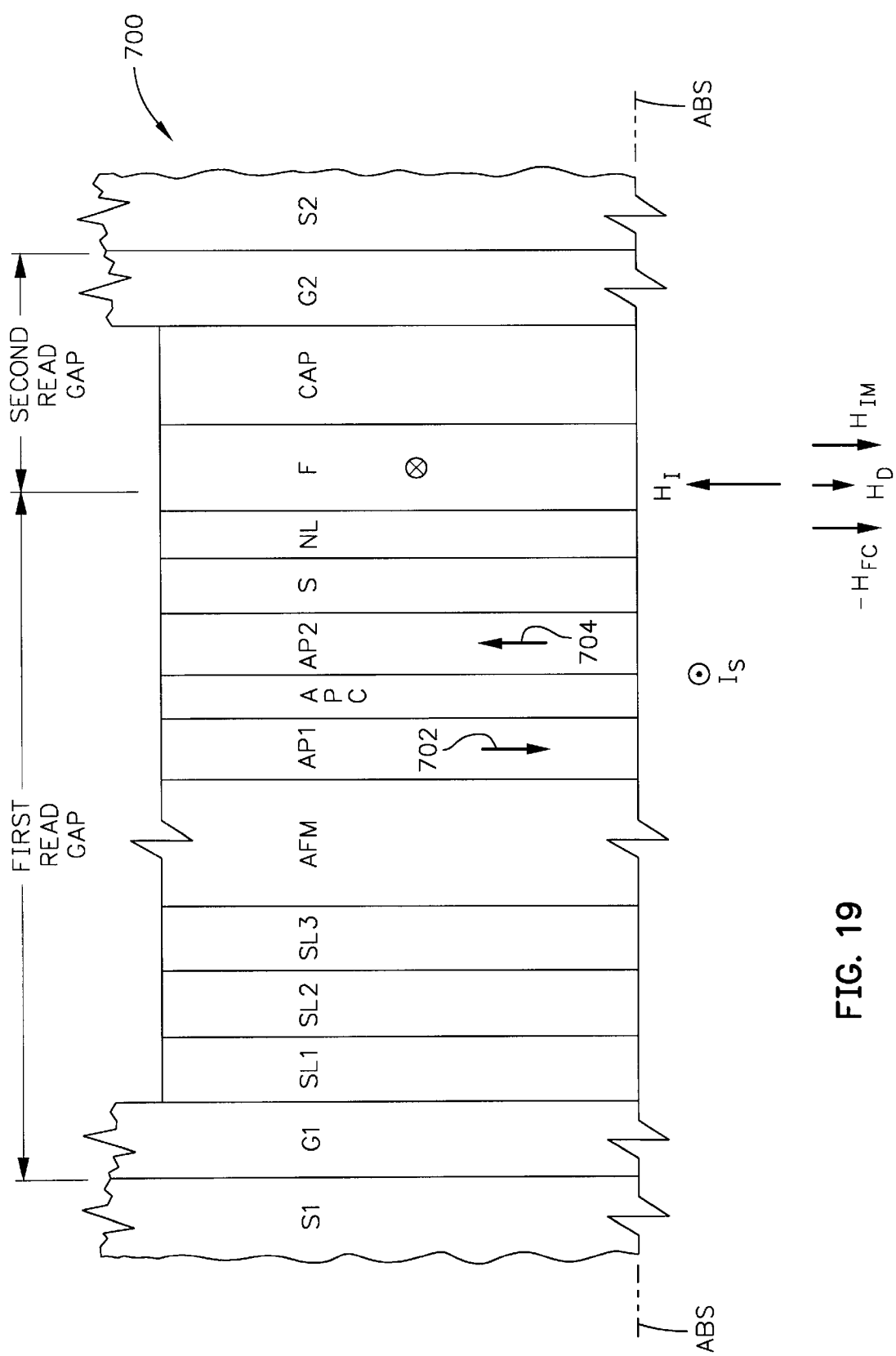
FIG. 19 is the same as FIG. 18 except the directions of the sense current $I_S$ and the magnetic moments of the first and second AP pinned (AP1 and AP2) are reversed.

The read head 700 in FIG. 19 is the same as the read head in FIGS. 17 and 18 except the directions of the sense current $I_S$ and magnetic moments 702 and 704 of the first and second AP pinned layers have been reversed. With this arrangement the sense current field $H_I$ exerted on the free layer structure 616 is directed into the head and opposes the negative ferromagnetic coupling field $-H_{FC}$, the net demagnetization field $H_D$ and the image current field $H_{IM}$. The orientation of the magnetic moment 640 of the free layer structure can be into the head as shown or out of the head.

Figure 20:
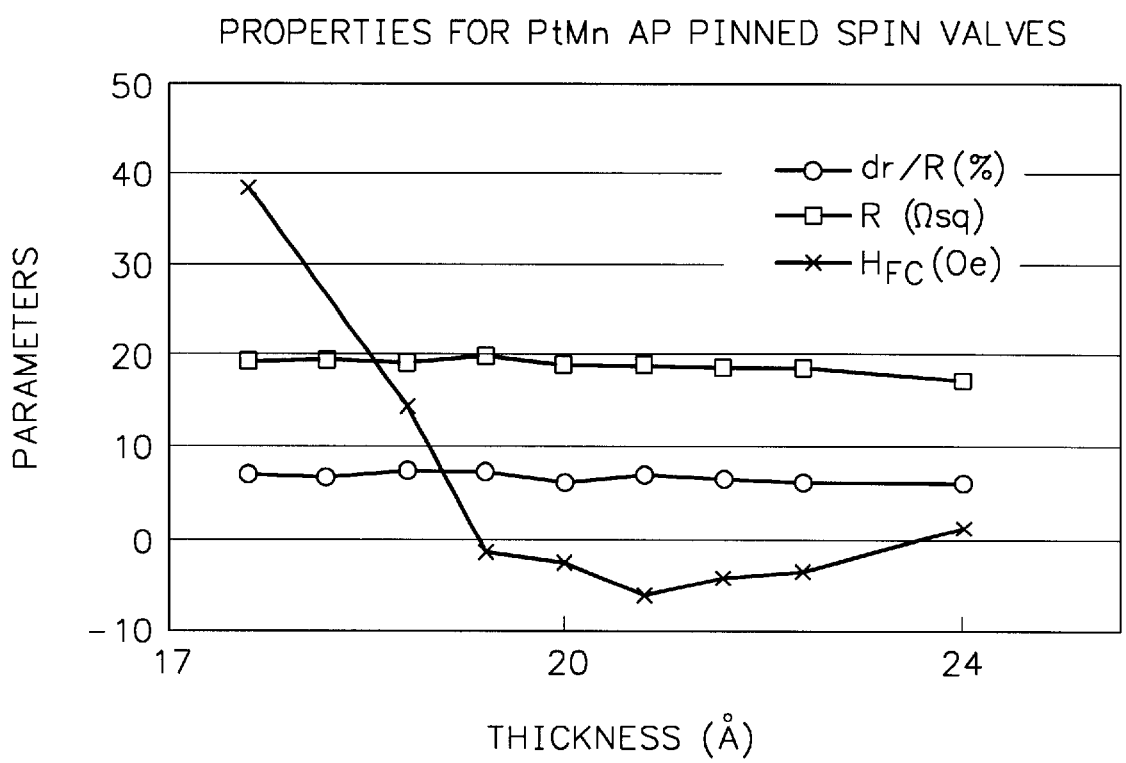
FIG. 20 is a graph showing various parameters for various thicknesses of a copper spacer layer of the spin valve sensor shown in FIG. 17.

The read head 600 in FIGS. 17 and 18 was evaluated for various parameters which are shown in the chart in FIG. 20. The abscissa shows variations in the thickness of the copper spacer layer 612 and the ordinate shows the various parameters which are ferromagnetic coupling field $H_{FC}$, resistance R of the sensor and magnetoresistive coefficient dr/R. It can be seen that when the thickness of the spacer layer 612 is in the range of approximately 19 Å to 24 Å that the ferromagnetic coupling field $H_{FC}$ is negative and that for other thicknesses the ferromagnetic coupling field $H_{FC}$ is positive. When the thickness of the spacer layer 612 is 21 Å, as shown in the preferred embodiment in FIGS. 17 and 18, the negative ferromagnetic coupling field $-H_{FC}$ is at a maximum of approximately −5 Oe. It should be noted that when the first seed layer 630 is omitted in the spin valve sensor 602 in FIG. 17 and the second seed layer 632 is directly on and interfaces the first gap layer 604 that the negative ferromagnetic coupling field $-H_{FC}$ will be about the same as when the first seed layer 630 is employed.

Clearly, other embodiments and modifications of this invention will occur readily to those of ordinary skill in the art in view of these teachings. For instance, instead of one of the AP pinned layers having a thickness greater than the other AP pinned layer, the one AP pinned layer may have a magnetic moment greater than the other AP pinned layer. An example is when the one AP pinned layer is made from cobalt iron (CoFe) and the other AP pinned layer is made of nickel iron (NiFe). Cobalt iron (CoFe) has a magnetic moment about 1.7 times that of nickel iron (NiFe) so that the one AP pinned layer may have a greater magnetic moment and yet be thinner than the other AP pinned layer. Therefore, this invention is to be limited only by the following claims, which include all such embodiments and modifications when viewed in conjunction with the above specification and accompanying drawings.

I claim:

1. A magnetic read head that has an air bearing surface (ABS), comprising:

nonmagnetic nonconductive first and second read gap layers;

a spin valve sensor located between the first and second read gap layers;

ferromagnetic first and second shield layers;
the first and second read gap layers being located between the first and second shield layers with the first read gap layer interfacing the first shield layer and the second read gap layer interfacing the second shield layer;
the spin valve sensor including:
a free layer structure that has a magnetic moment;
a ferromagnetic antiparallel (AP) pinned layer structure with a net magnetic moment that produces a net demagnetization field $H_D$ through the free layer structure in a direction perpendicular to the ABS;
a pinning layer exchange coupled to the AP pinned layer structure for pinning the net magnetic moment of the AP pinned layer structure; and
a nonmagnetic conductive spacer layer located between the free layer structure and the AP pinned layer structure;
the AP pinned layer structure including:
ferromagnetic first and second antiparallel (AP) pinned layers with the first AP pinned layer interfacing the pinning layer and the second AP pinned layer interfacing the spacer layer;
an antiparallel (AP) coupling layer located between and interfacing the first and second AP pinned layers; and
the second AP pinned layer having a magnetic moment that exerts a ferromagnetic coupling field $H_{FC}$ on the free layer structure in the direction perpendicular to the ABS;
a first read gap distance between the first shield layer and a middle of the free layer structure and a second read gap distance between the second shield layer and the middle of the free layer structure wherein one of the first and second read gap distances is greater than the other of the first and second read gap distances;
a sense current source for conducting a sense current in a predetermined direction through the sensor for producing a sense current field $H_I$ and a net image current field $H_{IM}$ perpendicular to the ABS through the free layer structure with the sense current field $H_I$ antiparallel to the net demagnetization field $H_D$, the ferromagnetic coupling field $H_{FC}$ and the net image current field $H_{IM}$.

2. A magnetic read head as claimed in claim 1 wherein the free layer structure includes a cobalt (Co) or cobalt based layer that interfaces the spacer layer.

3. A magnetic read head as claimed in claim 2 wherein the sense current source causes a sense current field from the free layer structure that opposes the net demagnetization field $H_D$.

4. A magnetic read head as claimed in claim 2 wherein the pinning layer is platinum manganese (PtMn).

5. A magnetic read head as claimed in claim 2 wherein the first read gap distance is greater than the second read gap distance and the pinning layer is closer to the first shield layer than to the second shield layer.

6. A magnetic read head as claimed in claim 2 wherein the first AP pinned layer has a greater magnetic moment than a magnetic moment of the second AP pinned layer.

7. A magnetic read head as claimed in claim 6 wherein the sense current source causes a sense current field from the free layer structure that opposes the net demagnetization field $H_D$.

8. A magnetic read head as claimed in claim 7 wherein the pinning layer is platinum manganese (PtMn).

9. A magnetic read head as claimed in claim 8 wherein the first read gap distance is greater than the second read gap distance and the pinning layer is closer to the first shield layer than to the second shield layer.

10. A magnetic head assembly comprising:
a write head including:
ferromagnetic first and second pole piece layers that each have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head that has an air bearing surface (ABS), the read head including:
nonmagnetic nonconductive first and second read gap layers;
a spin valve sensor located between the first and second read gap layers;
ferromagnetic first and second shield layers; and
the first and second read gap layers being located between the first and second shield layers with the first read gap layer interfacing the first shield layer and the second read gap layer interfacing the second shield layer;
the spin valve sensor including:
a free layer structure that has a magnetic moment;
a ferromagnetic antiparallel (AP) pinned layer structure with a net magnetic moment that produces a net demagnetization field $H_D$ through the free layer structure in a direction perpendicular to the ABS;
a pinning layer exchange coupled to the AP pinned layer structure for pinning the net magnetic moment of the AP pinned layer structure; and
a nonmagnetic conductive spacer layer located between the free layer structure and the AP pinned layer structure;
the AP pinned layer structure including:
ferromagnetic first and second antiparallel (AP) pinned layers with the first AP pinned layer interfacing the pinning layer and the second AP pinned layer interfacing the spacer layer;
an antiparallel (AP) coupling layer located between and interfacing the first and second AP pinned layers; and
the second AP pinned layer having a magnetic moment that exerts a ferromagnetic coupling field $H_{FC}$ on the free layer structure in the direction perpendicular to the ABS;
a first read gap distance between the first shield layer and a middle of the free layer structure and a second read gap distance between the second shield layer and the middle of the free layer structure wherein one of the first and second read gap distances is greater than the other of the first and second read gap distances; and
a sense current source for conducting a sense current in a predetermined direction through the sensor for producing a sense current field $H_I$ and a net image current field $H_{IM}$ perpendicular to the ABS through the free layer structure with the sense current field $H_I$ antiparallel to the net demagnetization field $H_D$, the ferromagnetic coupling field $H_{FC}$ and the net image current field $H_{IM}$.

11. A magnetic head assembly as claimed in claim 10 wherein the free layer structure includes a cobalt (Co) or cobalt based layer that interfaces the spacer layer.

12. A magnetic head assembly as claimed in claim 11 wherein the sense current source causes a sense current field from the free layer structure that opposes the net demagnetization field $H_D$.

13. A magnetic head assembly as claimed in claim 11 wherein the pinning layer is platinum manganese (PtMn).

14. A magnetic head assembly as claimed in claim 11 wherein the first read gap distance is greater than the second read gap distance and the pinning layer is closer to the first read gap layer than to the second read gap layer.

15. A magnetic head assembly as claimed in claim 11 wherein the first AP pinned layer has a greater magnetic moment than a magnetic moment of the second AP pinned layer.

16. A magnetic head assembly as claimed in claim 15 wherein the sense current source causes a sense current field from the free layer structure that opposes the net demagnetization field $H_D$.

17. A magnetic head assembly as claimed in claim 16 wherein the pinning layer is platinum manganese (PtMn).

18. A magnetic head assembly as claimed in claim 17 wherein the first read gap distance is greater than the second read gap distance and the pinning layer is closer to the first read gap layer than to the second read gap layer.

19. A magnetic disk drive that includes a magnetic head assembly wherein the magnetic head assembly has write and read heads, the magnetic disk drive comprising:
the write head having an air bearing surface (ABS) and including:
ferromagnetic first and second pole piece layers that each have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head having an air bearing surface (ABS) and including:
nonmagnetic nonconductive first and second read gap layers;
a spin valve sensor located between the first and second read gap layers;
ferromagnetic first and second shield layers;
the first and second read gap layers being located between the first and second shield layers with the first read gap layer interfacing the first shield layer and the second read gap layer interfacing the second shield layer;
the spin valve sensor including:
a free layer structure that has a magnetic moment;
a ferromagnetic antiparallel (AP) pinned layer structure with a net magnetic moment that produces a net demagnetization field $H_D$ through the free layer structure in a direction perpendicular to the ABS;
a pinning layer exchange coupled to the AP pinned layer structure for pinning the net magnetic moment of the AP pinned layer structure; and
a nonmagnetic conductive spacer layer located between the free layer structure and the AP pinned layer structure;
the AP pinned layer structure including:
ferromagnetic first and second antiparallel (AP) pinned layers with the first AP pinned layer interfacing the pinning layer and the second AP pinned layer interfacing the spacer layer;
an antiparallel (AP) coupling layer located between and interfacing the first and second AP pinned layers; and
the second AP pinned layer having a magnetic moment that exerts a ferromagnetic coupling field $H_{FC}$ on the free layer structure in the direction perpendicular to the ABS;
a first read gap distance between the first shield layer and a middle of the free layer structure and a second read gap distance between the second shield layer and the middle of the free layer structure wherein one of the first and second read gap distances is greater than the other of the first and second read gap distances;
a housing;
a magnetic disk rotatably supported in the housing;
a support mounted in the housing for supporting the magnetic head assembly with their air bearing surfaces facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly for controlling movement of the magnetic disk and for controlling the position of the magnetic head assembly; and
the processor including a sense current source for conducting a sense current in a predetermined direction through the sensor for producing a sense current field $H_I$ and a net image sense current field $H_{IM}$ perpendicular to the ABS through the free layer structure with the sense current field $H_I$ antiparallel to the net demagnetization field $H_D$, the ferromagnetic coupling field $H_{FC}$ and the net image current field $H_{IM}$.

20. A magnetic disk drive as claimed in claim 19 wherein the free layer structure includes a cobalt (Co) or cobalt based layer that interfaces the spacer layer.

21. A magnetic disk drive as claimed in claim 20 wherein the sense current source causes a sense current field from the free layer structure that opposes the net demagnetization field $H_D$.

22. A magnetic disk drive as claimed in claim 20 wherein the pinning layer is platinum manganese (PtMn).

23. A magnetic disk drive as claimed in claim 20 wherein the first read gap distance is greater than the second read gap distance and the pinning layer is closer to the first read gap layer than to the second read gap layer.

24. A magnetic disk drive as claimed in claim 20 wherein the first AP pinned layer has a greater magnetic moment than a magnetic moment of the second AP pinned layer.

25. A magnetic disk drive as claimed in claim 24 wherein the sense current source causes a sense current field from the free layer structure that opposes the net demagnetization field $H_D$.

26. A magnetic disk drive as claimed in claim 25 wherein the pinning layer is platinum manganese (PtMn).

27. A magnetic disk drive as claimed in claim 26 wherein the first read gap distance is greater than the second read gap distance and the pinning layer is closer to the first read gap layer than to the second read gap layer.

28. A method of making a magnetic read head, which includes a spin valve sensor, comprising the steps of:
forming nonmagnetic nonconductive first and second read gap layers;
forming a spin valve sensor with an air bearing surface (ABS) between the first and second read gap layers;
forming ferromagnetic first and second shield layers;
forming the first and second read gap layers between the first and second shield layers with the first read gap layer interfacing the first shield layer and the second read gap interfacing the second shield layer;

forming the spin valve sensor as follows:

forming a free layer structure that has a magnetic moment;

forming a ferromagnetic antiparallel (AP) pinned layer structure with a net magnetic moment that produces a net demagnetization field $H_D$ through the free layer structure in a direction perpendicular to the ABS;

forming a pinning layer exchange coupled to the AP pinned layer structure for pinning the net magnetic moment of the AP pinned layer structure; and forming a nonmagnetic conductive spacer layer between the free layer structure and the AP pinned layer structure;

forming the AP pinned layer structure as follows:

forming ferromagnetic first and second antiparallel (AP) pinned layers with the first AP pinned layer interfacing the pinning layer and the second AP pinned layer interfacing the spacer layer;

forming an antiparallel (AP) coupling layer between and interfacing the first and second AP pinned layers; and forming the second AP pinned layer with a magnetic moment that exerts a ferromagnetic coupling field $H_{FC}$ on the free layer structure in the direction perpendicular to the ABS;

forming a first read gap distance between the first shield layer and a middle of the free layer structure arid a second read gap distance between the second shield layer and the middle of the free layer structure with one of the first and second read gap distances being greater than the other of the first and second read gap distances; and conducting a sense current in a predetermined direction through the sensor for producing a sense current field $H_I$ and a net image sense current field $H_{IM}$ perpendicular to the ABS through the free layer structure with the sense current field $H_I$ antiparallel to the net demagnetization field $H_D$, the ferromagnetic coupling field $H_{FC}$ and the net image current field $H_{IM}$.

29. A method as claimed in claim 28 wherein the free layer structure is formed with a cobalt (Co) or cobalt based layer that interfaces the spacer layer.

30. A method as claimed in claim 29 wherein said conducting of the sense current through the sensor causes a sense current field from the free layer structure that opposes the net demagnetization field $H_D$.

31. A method as claimed in claim 29 wherein the pinning layer is formed of platinum manganese (PtMn).

32. A method as claimed in claim 29 including sizing the layers so that the first read gap distance is greater than the second read gap distance and locating the layers so that the pinning layer is closer to the first shield layer than to the second shield layer.

33. A method as claimed in claim 29 wherein the first AP pinned layer is formed with a greater magnetic moment than a magnetic moment of the second AP pinned layer.

34. A method as claimed in claim 33 wherein said conducting of the sense current through the sensor causes a sense current field from the free layer structure that opposes the net demagnetization field $H_D$.

35. A method as claimed in claim 34 wherein the pinning layer is formed of platinum manganese (PtMn).

36. A method as claimed in claim 35 including sizing the layers so that the first read gap distance is greater than the second read gap distance and locating the layers so that the pinning layer is closer to the first shield layer than to the second shield layer.

37. A method of making a magnetic head assembly comprising the steps of:

making a write head including the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region;

making a read head, having an air bearing surface (ABS), including the steps of:

forming a spin valve sensor and first and second nonmagnetic read gap layers with the spin valve sensor located between the first and second read gap layers;

forming ferromagnetic first and second shield layers; and forming the first and second read gap layers between the first and second shield layers; and a making of the spin valve sensor comprising the steps of:

forming a free layer structure that has a magnetic moment;

forming a ferromagnetic antiparallel (AP) pinned layer structure with a net magnetic moment that produces a net demagnetization field $H_D$ through the free layer structure in a direction perpendicular to the ABS;

forming a pinning layer exchange coupled to the AP pinned layer structure for pinning the net magnetic moment of the AP pinned layer structure; and forming a nonmagnetic conductive spacer layer between the free layer structure and the AP pinned layer structure;

forming the AP pinned layer structure as follows:

forming ferromagnetic first and second antiparallel (AP) pinned layers with the first AP pinned layer interfacing the pinning layer and the second AP pinned layer interfacing the spacer layer;

forming an antiparallel (AP) coupling layer between and interfacing the first and second AP pinned layers; and forming the second AP pinned layer with a magnetic moment that exerts ferromagnetic coupling field $H_{FC}$ on the free layer structure in the direction perpendicular to the ABS;

forming a first read gap distance between the first shield layer and a middle of the free layer structure and a second read gap distance between the second shield layer and the middle of the free layer structure with one of the first and second read gap distances being greater than the other of the first and second read gap distances; and conducting a sense current in a predetermined direction through the sensor for producing a sense current field $H_I$ and a net image sense current field $H_{IM}$ perpendicular to the ABS through the free layer structure with the sense current field $H_I$ antiparallel to the net demagnetization field $H_D$, the ferromagnetic coupling field $H_{FC}$ and the net image current field $H_{IM}$.

38. A method as claimed in claim 37 wherein the free layer structure is formed with a cobalt (Co) or cobalt based layer that interfaces the spacer layer.

39. A method as claimed in claim 38 wherein said conducting of the sense current through the sensor causes a sense current field from the free layer structure that opposes the net demagnetization field $H_D$.

40. A method as claimed in claim 38 wherein the pinning layer is formed of platinum manganese (PtMn).

41. A method as claimed in claim 38 including sizing the layers so that the first read gap distance is greater than the second read gap distance and locating the layers so that the pinning layer is closer to the first shield layer than to the second shield layer.

42. A method as claimed in claim 38 wherein the first AP pinned layer is formed with a greater magnetic moment than a magnetic moment of the second AP pinned layer.

43. A method as claimed in claim 42 wherein said conducting of the sense current through the sensor causes a sense current field from the free layer structure that opposes the net demagnetization field $H_D$.

44. A method as claimed in claim 43 wherein the pinning layer is formed of platinum manganese (PtMn).

45. A method as claimed in claim 44 including sizing the layers so that the first read gap distance is greater than the second read gap distance and locating the layers so that the pinning layer is closer to the first shield layer than to the second shield layer.

* * * * *